(No Model.) 2 Sheets—Sheet 1.
H. M. ROSE.
DISK HARROW.
No. 318,395. Patented May 19, 1885.
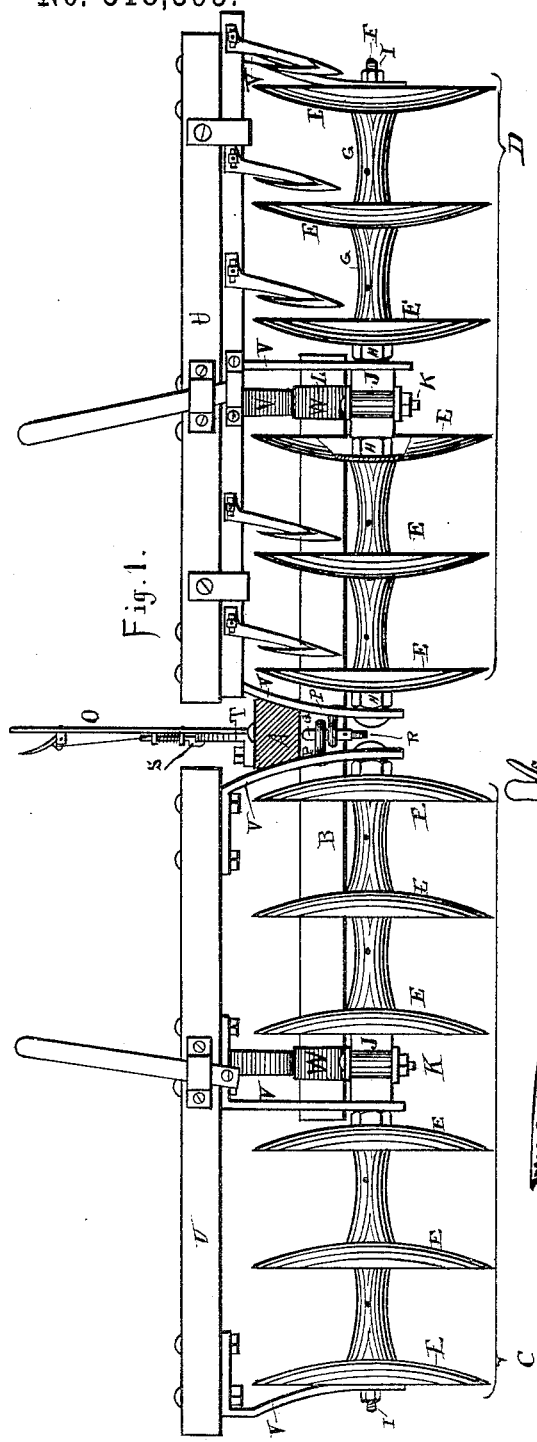
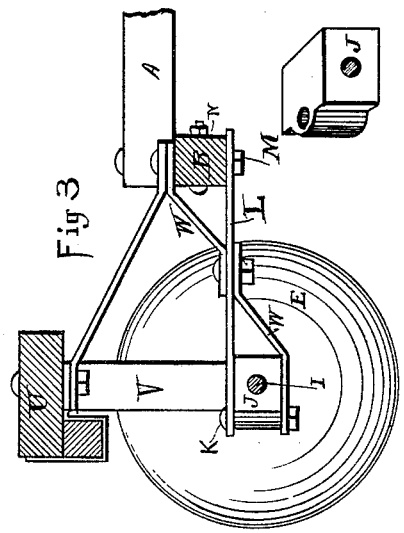
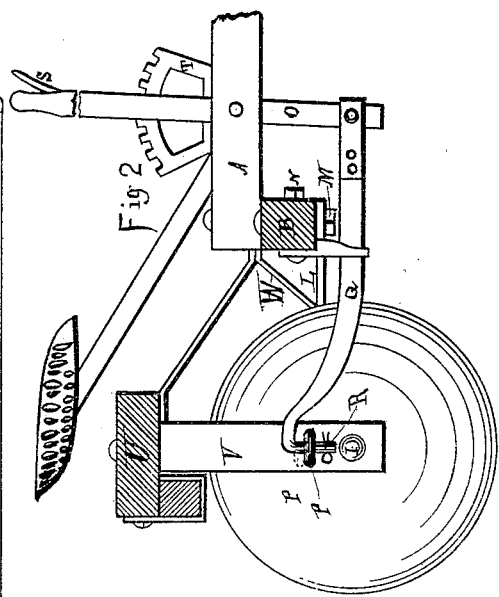
Witness:
O. D. Hall
L. R. Orr
Inventor
H. M. Rose (No Model.) 2 Sheets—Sheet 2.
H. M. ROSE.
DISK HARROW.
No. 318,395. Patented May 19, 1885.
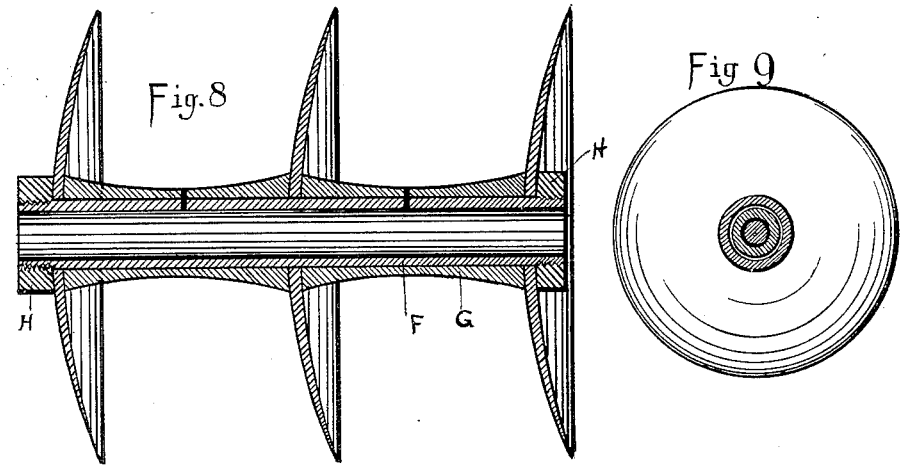
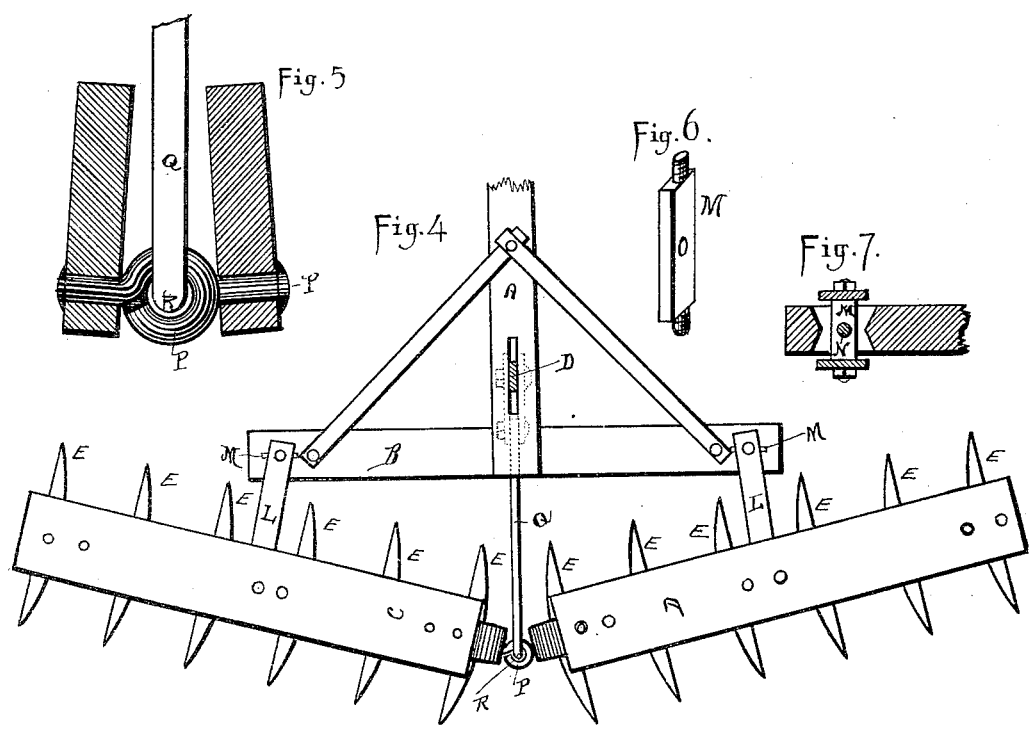
Witness: O. D. Haw.
L. P. Orr.
Inventor
H. M. Rose

UNITED STATES PATENT OFFICE.

HENRY M. ROSE, OF WATERMAN, ILLINOIS.

DISK-HARROW.

SPECIFICATION forming part of Letters Patent No. 318,395, dated May 19, 1885.

Application filed January 9, 1885. (No model.)

*To all whom it may concern:*

Be it known that I, HENRY M. ROSE, of Waterman, De Kalb county, in the State of Illinois, have invented new and useful Improvements in Revolving Harrows of that class commonly known as Disk-Harrows, of which the following is a specification.

Harrows which revolve in vertical planes and receive their rotary motion from contact with the soil, above and parallel with which their axes are caused to advance, have been in use for a long time. Originally they consisted of rotating shafts set oblique to the line of advance, and armed with teeth projecting radially from the several sides of said shaft. Later, disks serrated along the edges were employed, instead of teeth, and later still, disks concave on one side have been more generally employed; but all obtain their rotary motion from the same source. From the beginning the obliquity of the shaft to the line of advance has been made variable by adjustment of the supporting-boxes. The harrows have generally been arranged in gangs, of which those on one side the median line were inclined in one direction and those on the other side were inclined in the opposite direction, so that in operation they would balance each other and obviate side draft. In many instances the gangs have had center attachments to the dragging-frame and have been controlled as to obliquity by being coupled at their adjacent ends to each other or to one or more connecting-rods leading forward to a lever, whereby the riding attendant can at will shift the oblique direction of the shaft, and said lever has been provided with the familiar latch and rack long employed on harvesting and other agricultural machines for holding the adjusting-lever in place.

In the Letters Patent No. 261,875, granted to me August 1, 1882, the gangs are shown jointed at their centers to drag-bars, so as to balance on the draft. The front end of the drag-bar is attached to the tongue-frame by means of a vertical bolt, which passes through a hole having lateral expansions, so that said bolt can rock therein.

My present improvement consists in making said joint with a horizontal axis, as well as a vertical one. In my said patent the adjacent ends of the gangs are not connected together, but have independent connecting-rods running forward to the lower arm of the hand-lever. I now couple the adjacent ends together by means of bolts and a pintle at the rear end of a single connecting-rod, and thereby I secure a joint of simple construction and the utmost flexibility, which can be taken apart and put together again without tools, and which cannot be obstructed or deranged.

In these machines, handled mostly by persons ignorant of mechanics, it is important that separable parts shall be constructed to come apart and to go together again without trouble or the use of tools, so far as possible.

Therefore, my improvement relates to the mode of coupling the adjacent ends of the gangs; to the manner of holding said gangs in adjusted position; to the manner of making the universal joint connection between the gang and the dragging-frame.

That others may fully understand my improvement I will particularly describe it, having reference to the accompanying drawings; wherein—

Figure 1 is a rear elevation of my machine. Fig. 2 is a longitudinal central section of the same. Fig. 3 is a longitudinal section through the middle of the gang. Fig. 4 is a plan view of my machine. Fig. 5 is a detail of the middle or gang joint. Figs. 6 and 7 are details of the drag-bar joint. Figs. 8 and 9 are details showing structure of gang-section.

A is the tongue, to which the draft-team attached, and B is a cross-bar attached to the tongue at its rear end, and constituting a dragging-frame for the gangs C D of harrow-disks E, mounted on shafts preferably in the manner shown in my said Patent No. 261,875, where in three disks are made up in a single set by being placed upon a hollow shaft, F, with interposed spacing thimble sleeves G, and the whole secured rigidly together by nuts H at the ends of the hollow shaft F. Two of these sets are mounted upon a shaft, I, which passes through the hollow shafts F, and at the center through the block J, which oscillates upon a pin, K, attached to the drag-bar L, so that the whole gang can swing in a horizonta plane on said pin K, as an axis, to shift or adjust the obliquity of the shaft I to the line of draft. It is also necessary to permit the gang to oscillate transversely to conform to undulations of the ground transverse to the line of draft. In my said patent the forward end of the drag-bar is connected to the dragging-frame by a straight pin which passes through a hole in said drag-bar, said hole being expanded at top and bottom to permit said pin to oscillate. I now provide a plate, M, with means at each end for connection with the drag-bar, and at the center an axis-bolt, N, longitudinal as to the machine whereon said plate M may oscillate as a positive pivot. By this means the gang is balanced as to resistance encountered at each side its center and therefore easy to control as to the obliquity of its position, and also free to follow and conform to the transverse undulations of the ground over which it is caused to advance.

In my said patent the adjacent ends of the gangs were each provided with a coupling-plate, from which plates independent rods passed forward to the lower end of the hand-lever O, thus leaving the two gangs in a measure independent of each other, and requiring two connecting-rods to the hand-lever. To obviate the inconvenience of this mode of connecting up the parts, especially with reference to cost of manufacture, convenience of setting up by the purchaser, and packing for shipment, &c., I provide each of the adjacent ends of the gangs with an eyebolt, P, set at slightly unequal heights, so as to pass by each other freely, as shown in Fig. 1. The connecting-rod Q has a pintle, R, at its rear end, which passes down through both of the eye-bolts P, as shown, and is conveniently prevented from being withdrawn by a key or pin. The adjacent ends of the gangs are thereby coupled in a most convenient, effective, and expeditious way, easy to be uncoupled at any time when it may be required.

The forward end of the connecting-rod Q is jointed to the lower end of the hand-lever O, and thereby the obliquity of the gangs to the line of advance may be changed at will by the riding attendant. A notch-rack, T, mounted upon the tongue and hand-latch S, mounted upon the lever O, and in engagement with said rack, serves to hold the lever and gangs in such adjustment as may be desired.

A girt or plank, U, is connected with the axis rod or shaft I by means of hangers V—preferably one at each end and one in the middle, adjacent to the pivot-block J. The use of this girt is to support and stiffen the axis-rod I, and to provide a place of attachment for the eye-bolts P, which are secured to the inner end hangers of the respective gangs.

In my Patent No. 261,875 the drag-bar consisted of two bars extending, respectively, from the top and bottom of the dragging-frame to the top and bottom of the joint-block, through which the gang-shaft passes. The course of each of said bars was oblique to the axes of the joint at each end. I now make my drag-bar L of a plate or bar extending from the bottom of the dragging-frame B to the top of joint-block J, and therefore said drag-bar is perpendicular to the axes of the joint parts K M, and the traction is in line with said bar; but to support said joint parts K M, I employ the braces W, one end of each being riveted to said drag-bar, and the other ends, respectively, supporting said joint parts.

Having described my invention, I claim—

1. In a disk-harrow, the disk-gangs provided with eyebolts at their inner ends, combined with a pintle or hook-bar inserted through said eyebolts and attached to the draft-frame, whereby said disk-gangs are coupled and maintained in place.

2. The combination, in a disk-harrow of the kind referred to, of two gangs of disks, each jointed to its drag-bar at or near its center of length, the eyebolts P P in the adjacent ends of the said gangs, respectively, the connecting-rod Q, with a pintle, R, at one end, and the hand-lever O, fulcrumed on the frame and jointed to the other end of said connecting-rod.

3. In a disk-harrow, the disk-gangs coupled at their centers and at their inner ends to the draft-frame by means of the draw-bars L, plate M, eyes P P, and a connecting-rod, Q, with a pintle or hook at its rear end in engagement with said eyes.

4. The combination, in a disk-harrow, of the following elements: a draft-frame, disk-gangs C D, each set up in sections, a non-rotating axis-rod, girt U, and supporting-hangers V, said gangs being coupled together at their adjacent ends by means of eyes P P, attached to said gangs, respectively, a connecting-rod, Q, with pintle R, in engagement with said eyes, a pivoted draft-block, J, on said axis-rod at or near its center, a drag-bar, L, pivoted to said block and to the draft-frame, and a joint-plate, M, on a horizontal axis-pin, N.

5. The combination, in a disk-harrow, of the following elements: a draft-frame, disk-gangs, each composed of two independent sections, a non-rotating axis-rod, a girt, U, and hangers V, at the ends and middle of said gangs, the eyes or eyebolts P P, attached to or projecting from the inner end hanger, and the connecting-rod Q, with its pintle R in engagement with said eyes.

6. The combination, in a disk-harrow, of the harrow-gang attached at its middle to the drag-bar by a joint having a vertical axis, and said drag-bar at its front end attached to the dragging-frame, with a joint having both a horizontal and a vertical axis by means of the joint-plate M, whereby said gang is enabled to move in all directions to vary its obliquity to the line of draft and to follow the undulations of the ground without cramping or binding.

H. M. ROSE.

Witnesses:
R. D. O. SMITH,
M. P. CALLAN.